May 26, 1931.　　　E. A. NELSON　　　1,807,167
VEHICLE WHEEL
Filed Jan. 29, 1925　　2 Sheets-Sheet 1

Inventor
EMIL A. NELSON

May 26, 1931. E. A. NELSON 1,807,167
VEHICLE WHEEL
Filed Jan. 29, 1925 2 Sheets-Sheet 2
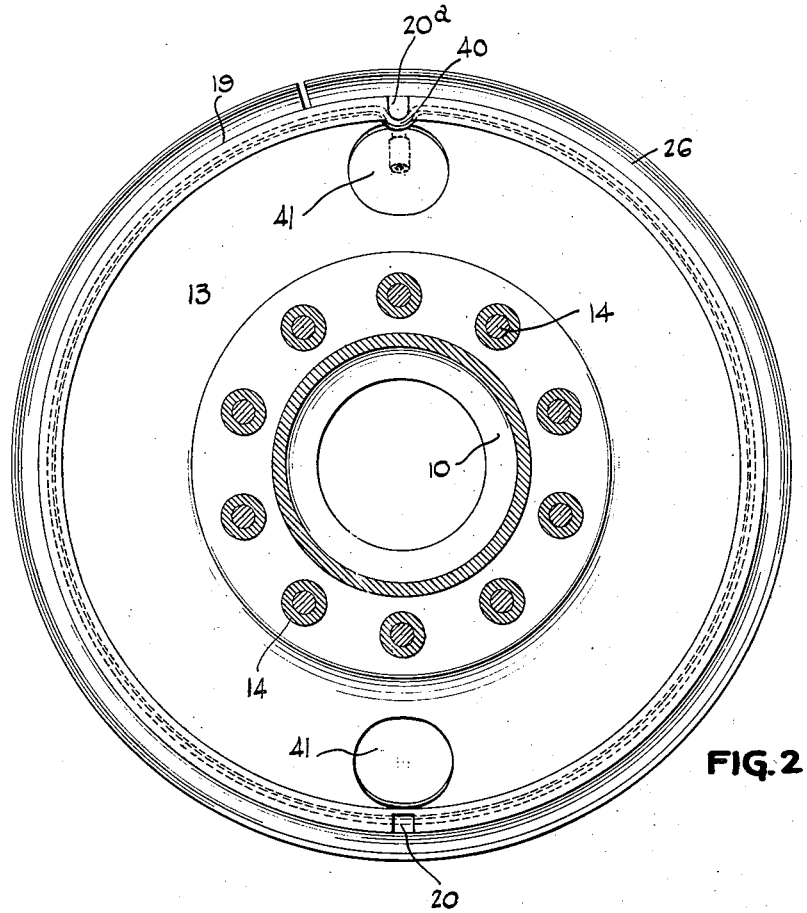
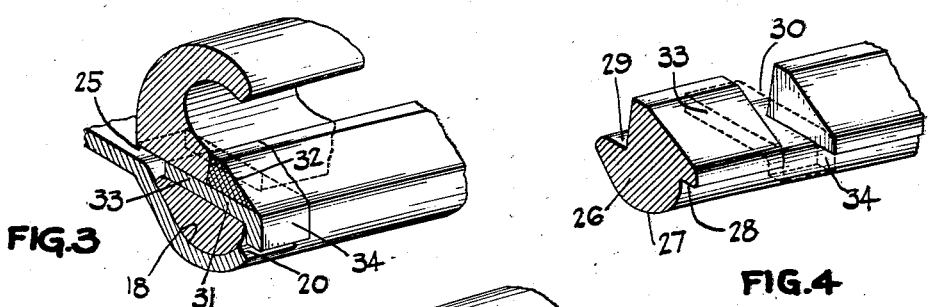
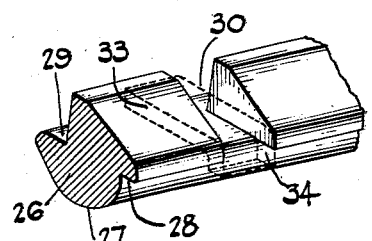
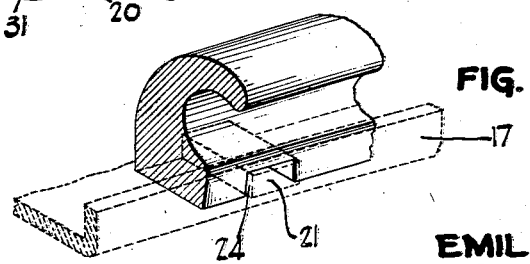
Inventor
EMIL A. NELSON
By *Jim H. Larbox*
Attorney Patented May 26, 1931

1,807,167

UNITED STATES PATENT OFFICE

EMIL A. NELSON, OF ABINGTON, PENNSYLVANIA, ASSIGNOR TO BUDD WHEEL COMPANY, OF PHILADELPHIA, PENNSYLVANIA, A CORPORATION OF PENNSYLVANIA

VEHICLE WHEEL

Application filed January 29, 1925. Serial No. 5,419.

My invention relates to automobile wheel structures, and, particularly, to those structures of the heavy duty type, used in what is known as motor transport service. In such service, heavy duty motor trucks and buses are used. The service is characterized by the carrying of very heavy loads across country and necessarily involves heavy driving torques.

In this service, it has been very common to employ either very heavy solid tires or extra heavy pneumatic tires, and to employ them both singly and in multiple. Oftentimes, not only the tires themselves are multiplied to distribute load and driving torque, but the wheel structures themselves are multiplied accordingly so as to secure a uniformity of distribution of loads and torques upon the driving axles and to obtain that more efficient distribution of the material of the structure through which maximum strength may be obtained with minimum weight. Firm fixing of the tires upon the rims, especially since the heavy balloon tire has come into general use, together with ease of removal and replacement has been difficult to obtain. Great also has been the difficulty in obtaining accessibility of parts for attention to tires, for inflation, and for the manipulations required in removal and replacement.

A principal object of my invention is to produce a heavy duty multiple wheel structure in which loosening or circumferential shifting of the inflated tires is effectually precluded irrespective of the type of mounting or retaining rings used, and irrespective of the type of valve employed.

A second object of scarcely less importance is the evolution of the structure in which there is a maximum of accessibility of parts for all purposes, especially of the tire valves, irrespective of the number of individual wheel structures entering into the structure at large.

The first of these principal objects I attain by locking all of the removable rim flanges, and their retaining rings, to the rim itself so that the rubber side walls of the tire by reason of their great co-efficient of friction with the retaining flanges are effectually locked thereto when the tire is normally inflated. When the rings are locked to the rim according to my invention, the tire cannot shift. The second principal object I attain by opening the wheel structures from the part to be manipulated all the way to the outer face of the structure at large.

Other objects of my invention relate to the provision of a quick-detachable mounting or retaining ring which permits ready removal and replacement of the tire upon the rim and which at the same time effectually prevents the circumferential shifting of the tire on the rim, and to the provision for removal of the tire from the wheel with facility and without danger of injury to it or to its inflating nipple or valve stem.

Further objects will become apparent from the following description of one embodiment of my invention, a double wheel structure, it being understood that the single embodiment has been described merely for the purpose of illustrating my invention and that other embodiments thereof may be employed without departing from the spirit of the appended claim forming a part of this specification.

In the accompanying drawings, which disclose a preferred form of my invention in accordance with the following description, Fig. 1 is a sectional view taken diametrically through the structure;

Fig. 2 is a central section thereof taken on the line 2—2 of Fig. 1;

Fig. 3 is a detail view in perspective showing sections of the rim and a rim flange locked together by the intermediate locking ring;

Fig. 4 is a detail view in perspective showing a section of the locking ring and the manner of securing the locking lug thereto, the lug being shown in dotted lines and Fig. 5 is a detail view in perspective showing a section of an inner rim flange and the means for preventing its relative movement with respect to the wheel rim, the latter being shown in dotted lines.

Figure 1:
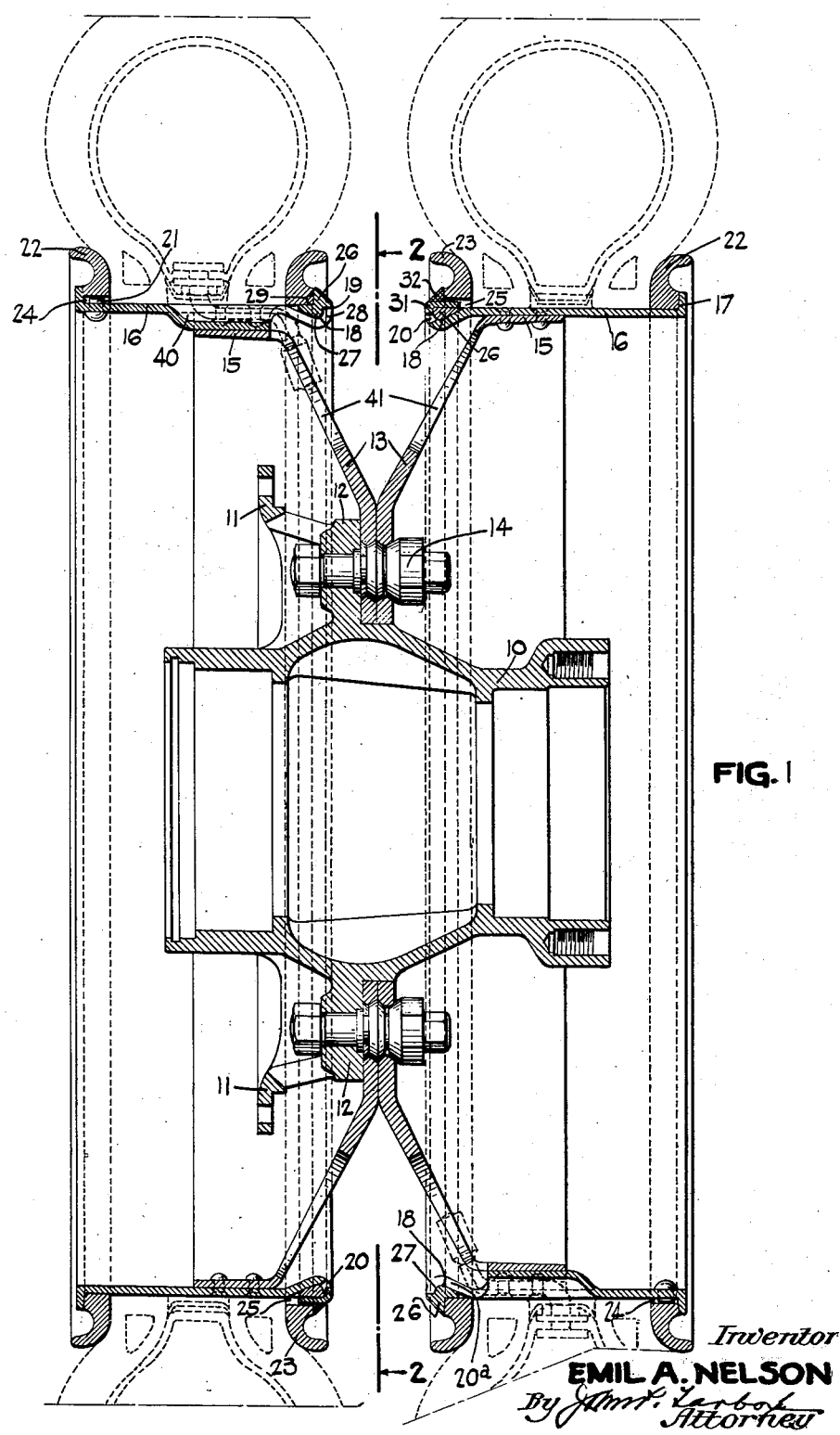

In general, this invention contemplates the use of two side flanges, both of which are locked to the wheel rim against relative rotation so that upon inflation of the tire any loosening or circumferential shifting thereof upon the rim is effectually precluded, and both of which are removable from a single side of the wheel. The wheel itself comprises the usual elements, such as the hub, the wheel disc and the flat rim base, all of which are joined together in a manner hereinafter to be described. The preferred embodiment of my invention is illustrated as being applied to what is known as the multiple wheel, which is essentially made up of two or more disc wheels suitably secured together. Inasmuch as the multiple wheel, per se, forms no part of my present invention, it is not thought necessary to describe its particular construction, except as it is affected by my invention, in any great detail. In the description which follows, similar reference characters are applied to similar parts throughout. The hub of the multiple wheel is designated by 10. This hub 10 is provided with a flange 12 intermediate its ends and against which the wheel discs or plates 13 are positioned. The bodies of these discs are of the usual dished construction and are arranged as is best shown in Fig. 1 with the outer peripheries thereof displaced from one another. These dished plates 13 are secured to the hub by a plurality of bolts 14. Secured to the hub 10 in any suitable manner is the usual brake drum collar 11.

The outer peripheries of the wheel discs or plates 13 are flanged as at 15. Suitably secured as by welding, riveting or otherwise to these flanges 15 are the flat rim bases 16. Inasmuch as the rim construction of the two wheels which form the multiple wheel are the same, the description which follows will apply to just the single wheel construction.

The rim base 16 is provided at one of its edges with an encircling, integral outstanding lip or flange 17. At the opposite edge of the rim base 16 is provided a circumferentially extending groove or gutter 18, the outer edge 19 of the outer wall of which is disposed in a plane coincident with or just within that of the plane of the rim base. A notch or slot 20 is provided in the outer wall of the gutter 18. Diametrically opposite this slot 20 in the gutter wall is the slot 20—a. Adjacent the integral lip or flange 17 is provided a lug 21, the purpose of which will be explained hereinafter. In this particular instance, the lug 21 is a square-headed stud riveted to the rim base 16, though any other suitable means may be employed for securing the lug thereto, such as forming an integral lug on the rim or by welding a lug thereto.

As was recited above, my invention contemplates the use of two rim flanges, which are adapted to frictionally engage the rubber sides of the tire casing so that upon inflation of the tire its circumferential shifting with respect to the rim is effectually precluded. One of these flanges, 22, I prefer to describe as the inner flange or ring, while the other of these flanges, 23, I prefer to describe as the outer flange. Both of these flanges are removable or detachable from the rim base 16. They are, however, removable from only one side of this rim, the side which is opposite the integral, outstanding lip 17. This is clearly apparent from Fig. 1. Each of these side engaging flanges 22, 23 are of a diameter sufficient to neatly encircle the rim base 16 and each is provided in its inner periphery with slots 24 and 25 respectively. They are structurally similar and therefore interchangeable.

Another structural element of my invention is a removable, quick-detachable locking flange 26 which is made in the form of a split ring. This locking flange 26 is of substantially S-shaped cross-section as is best shown in Figs. 1 and 4. Specifically, the inner surface of this split ring is contoured as at 27 to fit within the gutter 18 (shown in Figs. 3 and 4) and it has a substantially continuous, circumferential under-shoulder 28, also clearly shown in Figs. 1 and 4, and adapted to fit over the upper edge 19 of the outer side wall of the gutter. The outer surface of the locking ring 26 is circumferentially rabbeted as indicated at 29. A rather deep transversely extending slot or seat is formed at one point in the body of the ring. Within this seat 30 is disposed a lug member 31, the longitudinal cross-section of which is substantially L-shaped. This lug member 31 is secured within its seat 30 preferably by puddle welding, the weld being indicated by 32. As is best shown in Figs. 3 and 4, the lug 31 is provided with a transverse portion 33 which extends all the way across the rabbet 29, and an inwardly extending portion 34 which projects past the shoulder 28, all have a purpose which will be presently described.

It is my purpose to use in connection with the inner tube of the tire, one of the so-called right-angle valve stems. In order to protect this type of valve stem, a transverse depression 40 is formed in the surface of the flat rim base 16. This depression 40 is adapted to act as a protective housing for the valve stem or tube which is shown in dotted lines in Fig. 1. This housing 40 is open at that side of the wheel from which the tire is removed or replaced, the open end of the housing being opposite slot 20—a in the wall of the gutter 18. The valve stem is thus provided with a direct passage from one side of the rim through the slot 20—a and into its seat or housing 40.

The hereinabove described elements are assembled to form the completed structure of my invention. The inner ring or side flange 22 is first disposed upon the rim base 16 adjacent the integral lip 17. The lug 21 enters the slot 24. It prevents absolutely any relative rotative movement between the flange 22 and the rim base 16. The tire in its deflated condition is then slid upon the rim from its lipless side, the valve stem entering freely the depression 40 in the rim base. The outer flange 23 is then placed against the side of the tire with the slot 25 thereof in alignment with the slot 20 in the outer wall of the depression 18. The split locking ring is now put into position intermediate the flange 23 and the outer edge of the rim base 16 in such manner that the projecting transversely extending portion 33 of the lug 31 seats in the slot 25 while the downwardly extending portion 34 seats in the same slot 20—a through which the valve stem enters its depression 40. The locking ring is then sprung into the gutter 18 and its inner side 27 and shoulder 28 seat in the gutter 18 and on the gutter wall 19 respectively. When so seated, the lug 31 lying as it does in slots 25 and 20 in the seat flange and rim respectively effectually locks the whole structure together. Upon inflating the tire, a heavy pressure will be exerted upon the flanges 22, 23 outwardly and the rubber sides of the tire grip the inner faces of the rim flanges immovably. The tire, despite the freely floating valve and despite its heavy duty, positively cannot shift in place, for both side flanges are locked.

Adjacent the open end of the depression 40 in the rims are provided a plurality of aligned hand-holes 41 located within the bodies of the disc wheels. These hand-holes are of substantial dimension and are for the purpose of providing ready access to the valve stem for purposes of inflation or deflation of the tire or for purposes of adjustment. By providing these hand-holes in the manner just described, it is possible to form the ends of the valve stems in such manner as to be disposed within the bodies of the disc wheel where they are protected from possible injury. It is important that the depression 40, the slot 20—a, and hand-hole 41 be in communication with each other so that when the tire is placed upon the rim the valve stem will pass through the slot 20 into its depression or housing 40 with the outer end of the valve stem disposed within the hand-hole 41 or if desired on the inside of the disc. In the multiple wheel structure, the valve stems of the respective tires are relatively offset. Each wheel body is provided with a plurality of hand-holes equal to the number of valve stems in use in the multiple wheel. All of the hand-holes in the respective wheel bodies are aligned and by offsetting the valve stems from one another clear passages are insured thereto from the outside of the multiple wheel. This is clearly shown in Fig. 1.

In order to remove the tire from the wheel, it is only necessary to cause its deflation in any manner and then force the removable or detachable outer flange inwardly. This will permit removal of the split locking ring 26 and having removed this ring, the flange 23 may be slid off the rim together with the tire. Because of my construction of the protective housing for the valve tube, it becomes unnecessary to do any lifting or twisting of the tire to remove it from the rim, it being only necessary to pull it off sidewise, there being nothing in the way of the valve stem to obstruct its free passage.

Having set forth the objects of my invention in a structure embodying the principles thereof, I wish it to be understood that many changes in the specific details of the structure might readily occur to those skilled in the art and still fall within the spirit and scope of my invention.

What I claim is:

In combination, a vehicle rim having a circumferential depression adjacent one edge thereof and a notch formed in the lateral edge of said rim adjacent the depression, a retaining ring having a main body portion adapted to seat in said depression and an annular radially extending portion integral with said main body adapted to engage a tire securing flange, an axially extending notch in the periphery of said radially extending portion, an L-shaped member secured to said retaining ring and having a portion of one of its arms received within the notch in the retaining ring and another portion of said arm extended laterally beyond the tire securing flange engaging portion of said retaining ring, and an annular tire securing flange having a key-way on its inner circumference adapted to receive the last named portion of said arm, the other arm of said L-shaped member being adapted to be received within the notch in said rim.

In testimony whereof I hereunto affix my signature.

EMIL A. NELSON.